[72] Inventors Kaname Sakai
Kodaira-shi;
Akira Masaki, Hatano-shi, both of Japan
[21] Appl. No. 802,390
[22] Filed Feb. 26, 1969
[45] Patented Dec. 14, 1971
[73] Assignee Hitachi, Ltd.
Tokyo, Japan
[32] Priority Mar. 4, 1968
[33] Japan
[31] 43/13625

[54] HIGH-FREQUENCY INTEGRATED CIRCUIT DEVICE PROVIDING IMPEDANCE MATCHING THROUGH ITS EXTERNAL LEADS
5 Claims, 9 Drawing Figs.

[52] U.S. Cl. .................... 317/234 R, 317/234 F, 317/234 G, 317/234 J, 317/234 N
[51] Int. Cl. .................... H01l 11/00, H01l 15/00
[50] Field of Search .................... 317/234, 235, 3, 3.1, 4, 5, 5.3, 5.4; 29/586–589

[56] References Cited
UNITED STATES PATENTS

| | | | |
|---|---|---|---|
| 3,008,089 | 11/1961 | Uhlir | 317/234 |
| 3,257,588 | 6/1966 | Mueller | 317/234 |
| 3,274,459 | 9/1966 | Sterzer | 317/234 |
| 3,489,956 | 1/1970 | Yanai et al. | 317/234 |
| 3,509,434 | 4/1970 | Yanai et al. | 317/234 |
| 2,985,806 | 5/1961 | McMahon et al. | 317/234 |
| 3,142,783 | 7/1964 | Warren | 317/234 |
| 3,331,125 | 7/1967 | McCusker | 317/234 |
| 3,365,620 | 1/1968 | Butler et al. | 317/234 |
| 3,390,308 | 6/1968 | Marley | 317/234 |
| 3,400,448 | 9/1968 | Helda et al. | 317/234 |
| 3,497,947 | 3/1970 | Ardezzone | 317/234 |

*Primary Examiner*—John W. Huckert
*Assistant Examiner*—Andrew J. James
*Attorney*—Craig, Antonelli and Hill

ABSTRACT: A semiconductor integrated circuit means comprising a semiconductor substrate having a plurality of circuit elements formed therein and a package enclosing said substrate, wherein the wires for leading out the electrodes of said circuit elements from said package are formed of strip lines and the grounded conductor for said strip lines is made of a common metal plate.

INVENTORS
KANAME SAKAI
AKIRA MASAKI

BY Craig, Antonelli, Stewart & Hill
ATTORNEYS

INVENTORS
KAMANE SAKAI
AKIRA MASAKI

BY Craig, Antonelli, Stewart & Hill
ATTORNEYS

HIGH-FREQUENCY INTEGRATED CIRCUIT DEVICE PROVIDING IMPEDANCE MATCHING THROUGH ITS EXTERNAL LEADS

BACKGROUND OF THE INVENTION

1. Field of the Invention

This invention relates to a semiconductor device and more particularly to an integrated circuit means for very high-speed switching or ultrahigh frequencies.

2. Description of the Prior Art

Usually semiconductor circuit elements such as diodes and transistors are enclosed in a package of metal, resin or ceramics. In such case it is necessary that the electrodes of the semiconductor element are led out from the package by some means, the common one being to use a plurality of independent leads or metal wires extending towards the outside of the package. Recently, in the field of semiconductor integrated circuits manufacturing, the so-called flat package has been widely used for sealing. The integrated circuit is sealed in the package in such a manner that many independent leads connected to the electrodes or terminals of the circuit pass through the side face of the flat package and extend substantially in a plane. In this structure a reference voltage lead and other leads receiving or sending electric signals varying relative to the reference potential are not uniformly disposed with a constant spacing. If the integrated circuit is used at high frequencies, the influence of stray capacity or parasitic capacitance among the leads and electrodes becomes considerable. Since in the flat package system this capacitance is not uniform because of the unequal distance separating each wire, the waveforms of input or output signals between pairs of leads differ from each other. This occasionally causes practically unfavorable errors in the operation of an integrated circuit or a device including such circuit. Also the signal leakage between the leads is not negligible. Furthermore, when the integrated circuit means is to be mounted on a printed-circuit board, the conducting wires (leads) connecting the circuit element in the package with the metal layers on the printed-circuit board, being solid wires, present a nonnegligible inductance at high frequencies due to their relatively large length. The signal transmission lines suffer deterioration in the ultrahigh frequency transmission characteristic. At such ultrahigh frequencies signals or pulses are hardly transmitted because of waveform distortion. So, the signal transmission characteristic of the line sending (or receiving) a signal to (or from) the integrated circuit element in the package should be carefully considered in ultrahigh frequency usage. The most important thing is to match the characteristic impedance of the pair of leads or the signal transmission means with the impedance of the pair of terminals in the integrated circuit without causing signal reflection.

However, in the conventional lead arrangement it is difficult to match the characteristic impedance of the lead wires which electrically connect the electrodes of the integrated circuit in the package with the metal layer on the printed-circuit board with the terminal impedance of the integrated circuit. So even through the circuit elements in the integrated circuit means have excellent characteristics, mismatching in the lead wire inevitably causes a signal waveform distortion and reflection, the function of the circuit element being not fully utilized. The transmission of a signal with a rise time of 1 to 2 nsec. is extremely difficult with the conventional integrated circuit means.

In the integrated circuit means a plurality of circuit elements are densely integrated in and/or on a semiconductor substrate. Each circuit element has its maximum allowable operation temperature and operation above such temperature is not recommended. The heat generated in the means should be radiated under good conditions. This applies specifically when the integrated circuit means operates at very high speed and the use of nonsaturable type circuits such as CML (current mode logic) yields a large heat generation.

SUMMARY OF THE INVENTION

One object of this invention is to eliminate the above-mentioned inconveniences and provide a semiconductor device, particularly an integrated circuit means, suitable for very high speed and ultrahigh frequency usages.

Another object of this invention is to provide an integrated circuit means having a large thermal radiation efficiency.

The gist of the embodiments of this invention consists in the fact that the conducting wires are led out from the package body in the form of strip lines, the earth conductor for these strip lines being formed by a common metal plate.

According to one embodiment of this invention a semiconductor device is provided, which comprises a. a semiconductor substrate having therein and/or thereon at least one circuit element which includes at least one reference voltage terminal and first and second signal terminals receiving electric signals varying with respect to the reference voltage;

b. an insulating package enclosing said semiconductor substrate;

c. a signal transmission means extending out of said package and consisting of a metal plate, an insulating film disposed on the surface of said metal plate, and first and second thin metal layers extending on said insulating film;

d. means for electrically connecting said reference voltage terminal of said circuit element to said metal plate;

e. means for electrically connecting said first electrode terminal to said first metal layer; and f. means for electrically connecting said second electrode terminal to said second metal layer.

DESCRIPTION OF THE PREFERRED EMBODIMENTS

Prior to the detailed explanation of the embodiments of this invention a brief description will be made of a prior art for better understanding of this invention.

Figure 1:
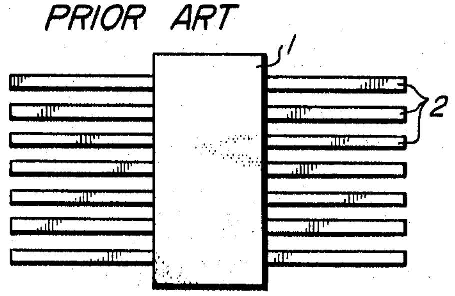
FIG. 1 PRIOR ART
FIGS. 1 and 2 are top and side views showing a conventional integrated circuit means, respectively.
Figure 2:
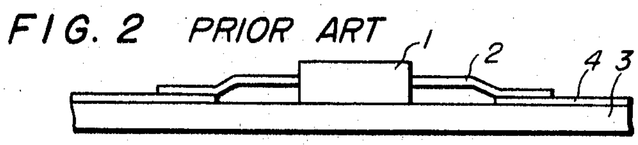
FIG. 2 PRIOR ART

In FIG. 1, showing a plan view of an example of the integrated circuit means which are commonly manufactured and used, 1 is a package body and 2 indicates the conducting wires (leads) fixed to the package and connected electrically to a circuit element accommodated in the package. Such a device is usually mounted on a printed-circuit board 3 as shown in FIG. 2, in which 4 indicates metal layers coated on the surface of said printed-circuit board, the connection between a lead wires 2 and a metal layer 4 being made by electric resistance welding.

Figure 3:
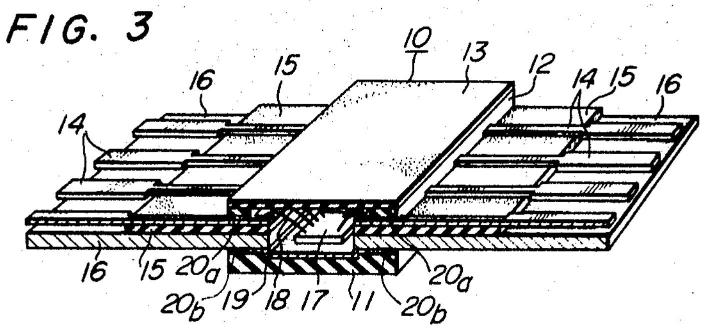
FIG. 3 is a perspective view, partially in section, of a semiconductor device according to one embodiment of this invention.

In FIG. 3, showing a semiconductor device according to one embodiment of this invention, 10 is a package body, 11, 12 and 13 are an insulating plate, an insulating frame and a cap which together compose the package, 14, 15 and 16 are conducting leads, insulating films, and a metal plate which compose strip lines led out from the package, 17 is a semiconductor substrate embodying an integrated circuit means, and 18 shows connecting wires for connecting the integrated circuit 17 and the conducting leads 14, 19 is a metal layer for connecting electrically the earth terminal for the integrated circuit 17 to the metal plate 16 which forms a common earth conductor for the strip lines. The metal layer 19 serves at the same time to fix mechanically the semiconductor substrate 17 to the surface of insulating substrate 11, the semiconductor substrate 17 containing a plurality of circuit elements which are combined to perform functional operation.

In the device of the above embodiment the insulating substrate 11 and insulating frame 12 are made of ceramics, the cap 13 is of KOVAR (trade name, alloy of iron, nickel and cobalt), and the conducting leads 14 and the metal plate 16 are of copper, or KOVAR plated with gold. The conducting leads 14 may be made as thin as possible so long as no hindrance is caused in handling. The insulating film 15 is made of epoxy resin or glass, preferably flexible and capable of thin processing. The strip line, formed by bonding together the conducting leads 14, the insulating film 15 and the relatively thick metal plate 16, has substantial flexibility. The package 10 is supported by the metal plate 16, which acts both as an earth conductor and a dissipation plate increasing remarkably the heat dissipation efficiency of the integrated circuit means.

Figure 4:
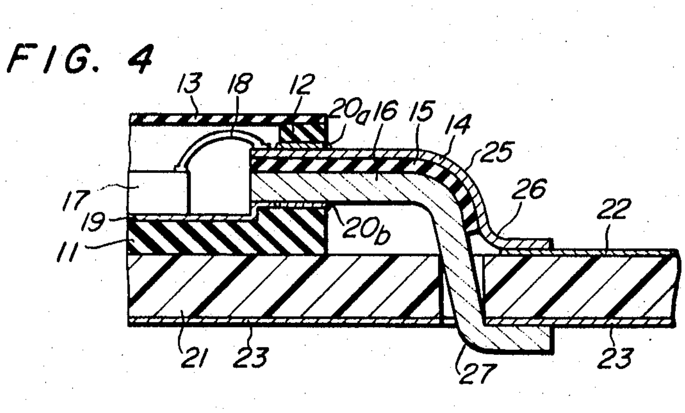
FIGS. 4 and 5 are cross-sectional views, each showing the main portion of a specific application of the embodiment shown in FIG. 3.
Figure 5:
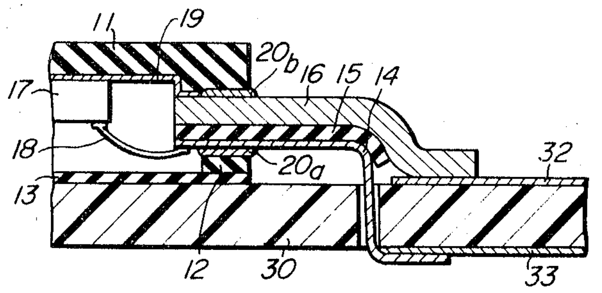

The concrete manner of mounting the integrated circuit means of this invention is as shown in partial cross section in FIGS. 4 and 5. In FIG. 4 like numerals are used to denote like parts as shown in FIG. 3. 20*a* and 20*b* designate adhesive agent for fixing the insulating plate 11, the metal plate 16, the conducting lead 14, and the insulating frame 12 mutually. 21 is a printed-circuit board, and 22 and 23 are metal layers for wiring disposed on the printed-circuit board. For the purpose of mounting the metal plate 16, the insulating film 15 and the conducting wire 14 are bent at positions 25 and 26. Next the metal plate 16 is inserted into a circuit formed in the printed-circuit board and bent at the position 27. Finally the metal plate 16 is connected with the metal layer 23, and the conducting wire 14 with the metal layer 22 respectively by welding or soldering. The metal layer 22 and the metal layer 23 for the earth conductor are disposed opposite to each other with respect to the printed-circuit board, forming a strip line. By this method mismatching of impedance between the strip line led out from the package and that on the printed-circuit board is decreased and hence the waveform deterioration and reflection of a signal can be reduced extremely. The transmission of ultrahigh frequency signals to and from the integrated circuit 17 becomes very satisfactory.

In FIG. 5, showing another example of mounting a metal plate 16 for earth conductor on the top surface of a printed-circuit board 30, 32 and 33 are metal layers connected to the metal plate 16 and the conducting lead 14 respectively.

Figure 6:
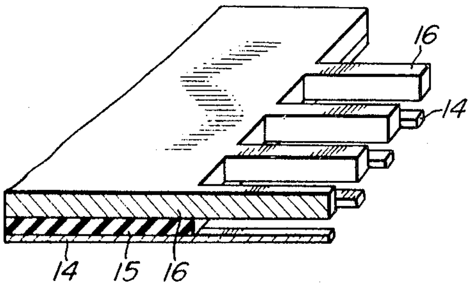
FIG. 6 is an enlarged view showing the tip portion of the lead wires according to another embodiment of this invention.

FIG. 6 shows an improvement on the tip portion of the metal plate in FIG. 3. The tip of the metal plate 16 is formed in a comb shape, as shown in the figure. The comb-shaped structure allows the tip of metal plate 16 and the metal layer 32 on the printed-circuit board to be welded or soldered very satisfactorily. In resistance welding the current flows exclusively in the comb-shaped section and without loss. In soldering due to the decreased heat dissipation from the metal board favorable results are obtained. Further in passing the metal plate tip through the printed-circuit board, there is no danger of diminishing its mechanical strength and no need of forming narrow long ditches in the printed-circuit board.

Figure 7:
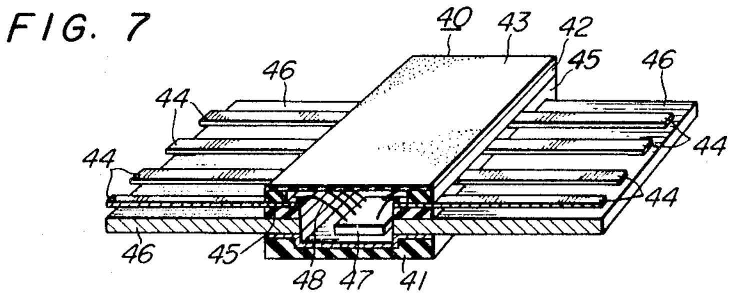
FIG. 7 is a perspective view, partially in section, of an integrated circuit means according to another embodiment of this invention.

In FIG. 7 showing a perspective view, partially in section, of a semiconductor integrated circuit means according to another embodiment of this invention, 40 is a package, 41 is an insulating plate for the package, 42 is an insulating frame, 43 is a cap, 44 designates conducting wires, 45 is an insulator, 46 is a metal plate, 47 is a semiconductor substrate containing an integrated circuit, and 48 designates connecting wires for connecting the electrode of the integrated circuit 47 and the conducting leads 44.

This embodiment is realized by using the same materials as in the embodiment of FIG. 3. The manufacture is as follows.

First mutual bonding is performed by the insulator 45 made of glass, etc. The conducting leads 44 of copper, etc. with prescribed gaps therebetween are bonded with the metal plate 46 by low melting point glass. Furthermore, the insulating substrate 41 and the insulating frame 42 are bonded by the same. Next an integrated circuit 47 is disposed and fixed in the insulating substrate 41, and connected to conducting leads 44 by connecting wires 48. In the final step, the entire body is sealed by a cap 43 of KOVAR or ceramics.

The conducting leads 44 and the metal plate 46 constitute strip lines. In this embodiment, if necessary, the width of conducting leads may be made small at the portion where they penetrate the package 40 in order to adjust the characteristic impedance.

Figure 8:
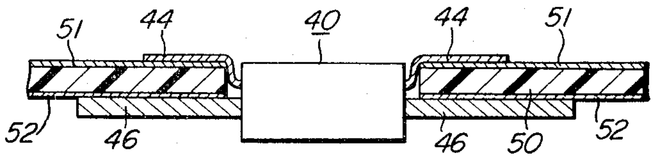
FIG. 8 is a cross-sectional view showing a concrete application of the embodiment shown in FIG. 7.

The manner of mounting the above device is as shown in FIG. 8 in which like reference numerals are used to denote like parts as shown in FIG. 7. 50 is a printed-circuit board, 51 is a metal layer for a signal channel and 52 is a metal layer for earth conductor. The printed-circuit board 50, the metal layers 51 and 52 constitute a strip line whose characteristic impedance is matched with that of a strip line formed by the conducting leads 44 and the metal plate 46. The conducting leads 44 and metal layer 51, and the metal plate 46 and the metal layer 52 are electrically connected by soldering or resistive welding.

Figure 9:
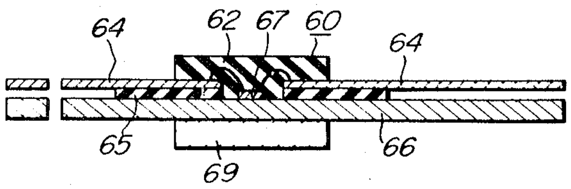
FIG. 9 is a cross-sectional view of a semiconductor device according to a further embodiment of this invention.

In FIG. 9 showing a further embodiment of this invention, 60 is a package, 62 is an insulator e.g. plastics for the package, 64 shows conducting wires, 65 is an insulator, 66 is a metal plate, 67 is an integrated circuit and 69 is a supporter. The conducting leads 64 and metal plate 66 form strip lines, fixed at a prescribed position by an insulator made of glass, ceramics, etc. The supporter 69 which may be neglected is provided in order to increase the mechanical strength of the package 60 and further promote the heat dissipation from the integrated circuit. The supporter 69 may be made of an insulator but preferably metal with high thermal conductivity. The integrated circuit is supported directly by the metal plate 67.

The manner of mounting in FIG. 9 can also be applied to the structures shown in FIGS. 4, 5 and 8.

As is evident from the above explanation, the conducting leads led out from the package constitute a strip line whose characteristic impedance is matched with that at the driving portion of the integrated circuit. By this constitution a very high-speed and ultrahigh frequency signal transmission free from distortion or deterioration of signals is effected. Harmful influences of reflection are extremely reduced.

The advantage of this invention is in its perfect grounding which is most important in very high-speed circuit systems.

Furthermore, since the conducting wires and the metal plate practically serve as heat dissipation plates, the device is extremely improved in heat dissipation efficiency.

The mechanical strength of the metal plate itself is large. In addition, since the metal plate and conducting leads are fixed on both sides of the printed-circuit board, the mechanical strength in mounting is further enhanced.

In accordance with the principles of this invention the above-mentioned embodiments are not restrictive but may be modified without departing from the spirit of this invention. Although the above embodiments are concerned with an integrated circuit means sealed in a flat package, this invention may be applied to the so-called dual-in-line package. Furthermore, the connectors which connect the terminals of the integrated circuit with the leadout strip lines may be designed to have prescribed characteristic impedance. The connection may be effected by e.g. the so-called beam leads without using connectors. And it is of course permissible to enclose in the packages proposed by this invention various semiconductor devices, such as hybrid integrated circuit devices, large scale integrated circuit devices, and so on.

We claim:

1. A semiconductor device comprising:

a semiconductor substrate, containing at least one circuit element for high frequency signals, which includes at least one reference voltage terminal and first and second electrode terminals connected thereto, said first and second electrode terminals receiving electric signals varying with respect to said reference voltage;

an insulating package containing said semiconductor substrate therein;

signal transmitting means extending out of said package and including a metal plate, an insulating film disposed on the surface of said metal plate and first and second thin metal leads extending over said insulating film with a predetermined constant space from said metal plate over the whole lengths of said first and second metal leads so as to substantially match the characteristic impedance of the metal leads with the impedance of said first and second electrode terminals connected to said semiconductor substrate without substantially causing any signal reflection;

means for electrically connecting said reference voltage terminal of said circuit element to said metal plate;

means for electrically connecting said first electrode terminal to said first metal lead; and means for electrically connecting said second electrode terminal to said second metal lead.

2. A semiconductor device according to claim 1, wherein said semiconductor substrate is directly fixed to said metal plate in said package.

3. A semiconductor device for high frequency signals comprising:

an insulating plate having one principal surface;

a semiconductor substrate disposed on said principal surface;

an insulating frame disposed on said insulating plate so as to surround said semiconductor substrate;

signal transmission means interposed between said insulating frame and said insulating plate, extending out of said insulating frame along said one principal surface, and comprising a metal plate, an insulating film having substantially uniform thickness disposed on the surface of said metal plate and a plurality of metal leads extending over said insulating film, said metal leads being spaced from said metal plate with a predetermined constant distance over the whole lengths of said metal leads;

means for electrically connecting said metal plate to a portion of said semiconductor substrate;

means for electrically connecting said plural metal leads to prescribed electrode portions of said semiconductor substrate; and a cap disposed on said insulating frame and sealing said semiconductor substrate in a hermetic space defined by said insulating plate, insulating frame and said cap, whereby the characteristic impedance of said metal leads is maintained at a substantially constant value for the high frequency signals applied to said metal leads.

4. A semiconductor device according to claim 3, wherein the tip portion of said metal plate extending from said insulating frame is comb shaped to respectively oppose said plural metal leads.

5. A semiconductor device according to claim 3, wherein said insulating plate and said insulating frame are made of ceramics.

* * * * *